United States Patent
Alsewailem

(10) Patent No.: US 9,511,527 B2
(45) Date of Patent: Dec. 6, 2016

(54) UNIVERSAL FEEDING SYSTEM FOR EXTRUDERS

(71) Applicant: Fares D Alsewailem, Riyadh (SA)

(72) Inventor: Fares D Alsewailem, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 565 days.

(21) Appl. No.: 13/849,497

(22) Filed: Mar. 23, 2013

(65) Prior Publication Data

US 2014/0284834 A1    Sep. 25, 2014

(51) Int. Cl.
| | |
|---|---|
| B29C 47/10 | (2006.01) |
| B29C 47/00 | (2006.01) |
| B29C 47/08 | (2006.01) |
| B29B 13/00 | (2006.01) |
| B29B 17/04 | (2006.01) |
| B29C 47/36 | (2006.01) |
| B29C 47/92 | (2006.01) |

(52) U.S. Cl.
CPC ........... *B29C 47/0004* (2013.01); *B29B 13/00* (2013.01); *B29B 17/0404* (2013.01); *B29C 47/0813* (2013.01); *B29C 47/369* (2013.01); *B29C 47/92* (2013.01); *B29B 2017/044* (2013.01); *B29B 2017/046* (2013.01); *B29C 47/0894* (2013.01); *B29C 47/1009* (2013.01); *B29C 47/1018* (2013.01); *B29C 2947/926* (2013.01); *B29C 2947/9259* (2013.01); *Y02P 70/263* (2015.11); *Y02W 30/521* (2015.05); *Y02W 30/625* (2015.05)

(58) Field of Classification Search
CPC ... B29C 47/0813; B29C 47/365; B29C 47/369
See application file for complete search history.

(56) References Cited

U.S. PATENT DOCUMENTS

| | | | |
|---|---|---|---|
| 6,357,680 B1* | 3/2002 | Irwin | B02C 18/142 241/167 |
| 2004/0066890 A1* | 4/2004 | Dalmijn | G01N 23/12 378/57 |
| 2005/0006813 A1* | 1/2005 | Yamane | B02C 18/148 264/211.21 |
| 2008/0128933 A1* | 6/2008 | Przybylinski | B29B 17/0026 264/31 |
| 2008/0248152 A1* | 10/2008 | Samann | B29C 47/0011 425/208 |

* cited by examiner

*Primary Examiner* — Ryan Ochylski
(74) *Attorney, Agent, or Firm* — Geeta Kadambi Riddhi IP LLC

(57) ABSTRACT

A novel universal main feeder is described for cutting the large items into smaller items before they are fed into the feeder, hopper of the extruder. The sensor based control and the cutting device based resizing and quantity control enables a non-clog and smoother operation for recycling or waste management. The unique design of interchangeable cutting device enables the user to fit the pertinent cutting device blade, knives, shredders or hammer mills.

9 Claims, 1 Drawing Sheet

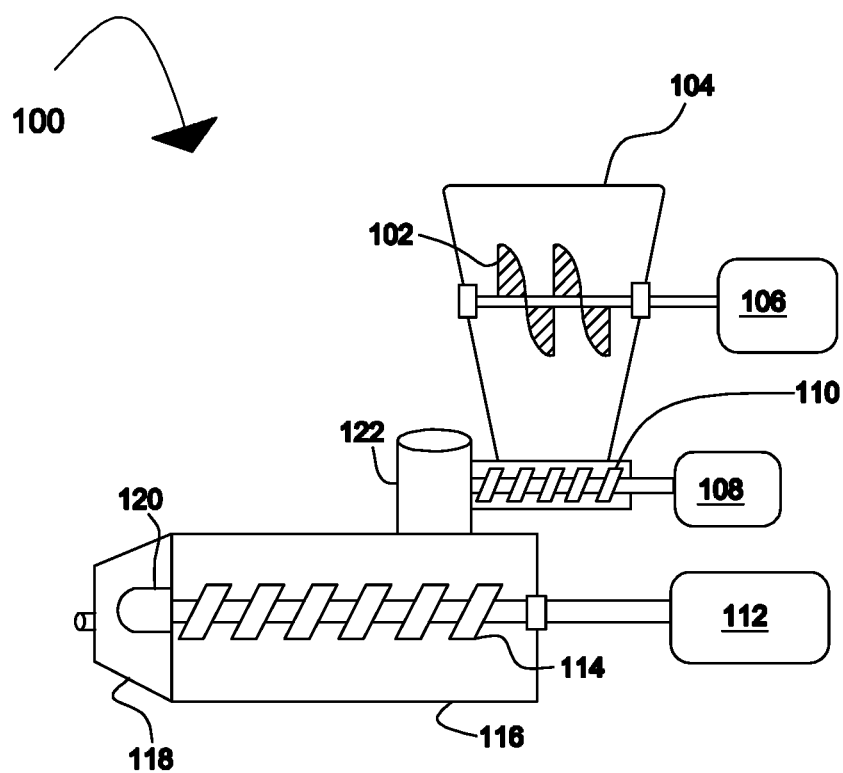

UNIVERSAL FEEDING SYSTEM FOR EXTRUDERS

FIELD OF TECHNOLOGY

This disclosure generally relates to a feeding system to the extruders as universal solution for reducing the size of the items to be recycled.

BACKGROUND

World Bank study reports 70% increase in the urban solid waste. Solid waste management is critical for urban development in various countries around the world. Modern waste management is a complex process, partly because of the number of items used in modern packaging and manufacturing processes and growing food waste. Metal and concrete waste from building industry, waste from consumer products are a serious issue for recycling plants as well. Bulky items such as plastic waste articles create a challenge for recycling industry and landfills take time to get decomposed. Postconsumer plastics form about 20 wt % of the municipal waste with high ratios of volume to weight which is in turns requires tremendous areas of landfills.

There is a need for a better waste management pertaining to bulk waste materials and specifically to plastic waste.

SUMMARY

The invention discloses a novel universal main feeder for extruders to reduce the size of disposable items before it gets into the main screw of an extruder. In another embodiment, a universal main feeder having a cutting device to reduce the size of the items being fed through them. In another embodiment, the cutting device is of various shapes to accommodate the shape of the items that is being fed.

In one embodiment, a motor is used for driving the cutting device shaft. In another embodiment, the speed and direction of the motor used for the cutting device shaft works in the same direction as the motor for the feeding screw motor. In another embodiment, the feeding screw motor and the cutting device shaft motor work in the same speed or opposite speeds.

In one embodiment, the bulk items when fed would be minimized so that inlet of an extruder does not get clogged. In another embodiment, the size and speed at which the reduced size material are fed into the feeding shaft drive by the universal main feeder may be adjusted based on how many pieces are already in the queue by using a sensor.

In one embodiment, the universal main feeder is part of an assembly for recycling that connects to feeding screw shaft, extruder inlet, extruder and die.

In one embodiment, a method to reduce the size of the waste items for extrusion and/or recycling using the universal main feeder having a cutting device is described. In another embodiment, large items that may be recycled to make new reusable product or sent to land fill by reducing their size to a small size using the cutting device situated in the universal main feeder.

The novel universal main feeder and method of using the universal main feeder along with other recycling equipment's, disclosed herein, may be implemented in any means for achieving various aspects. Other features will be apparent from the accompanying FIGURE and from the detailed description that follows.

BRIEF DESCRIPTION OF THE DRAWINGS

Example embodiments are illustrated by way of example in the accompanying FIGURE and like references indicate similar elements and in which:

Single view of the apparatus shows a recycling system 100 having universal main feeder having a cutting device.

Other features of the present embodiments will be apparent from the accompanying FIGURES and from the detailed description that follows.

DETAILED DESCRIPTION

Several embodiments for novel universal main feeding system for extruder are disclosed. Although the present embodiments have been described with reference to specific example embodiments, it will be evident that various modifications and changes may be made to these embodiments without departing from the broader spirit and scope of the various embodiments.

Single of view of the recycling system 100 having universal main feeder having a cutting device. In prior art extrusion technology, materials mainly plastics in form of pellets, flakes, or powders are fed to single or twin screw extruders through an automated feeding system (hopper equipped with screws and motor). Nowadays plastic waste is becoming a big issue that affects the environment and in order to prevent such problem recycling of plastic products is a necessity. One of the methods of plastic recycling is material or mechanical recycling where plastics articles such as containers, bottles, cutlery are shredded or granulated and then re-melted and shaped to new products by extruder, injection or compression molding, etc. In order to recycle discarded plastic articles such as water bottles, a size reduction step is necessary before feeding the material to an extruder. This is usually done by separate machines such as granulators and shredders. After that materials are conveyed to the extruder hoper through a conveyer belt. Here it is proposed to have a universal main feeder which includes along with the conveying screw, blades and cutters for processing whole plastic articles. In this case one can eliminate the need for separate granulators, shredders, or crushers.

As shown in the single of view of the recycling system 100 uses a universal main feeder 104 for reducing the size of a large item to a specific size and/or small size. The universal main feeder 104 can handle any shape of material such as whole plastic articles (e.g. 5 L PET water bottle) and bags, flakes, pellets, powders, etc. In plastic material recycling, one often has a granulator or a shredder machine which handles the size reduction of plastic articles before they can be fed to the extruder hopper. Extruders are only fed with polymers in form of pellets or powders. In the-current invention one can have a universal main feeder 104 with changeable cutting device 102 that can handle any type of plastic shape. These cutting devices are at least one of cutting blades, knives, shredders, hammer mills, etc. The choice of the cutting device depends on the type of large item that needs to be reduced to a small item. When the bulk plastic article such as HDPE milk jug is granulated it will fall into the feeding screw drive 110, which will then transfer the material in form of flakes or granules to the main extruder 116 to be melted and extruded. If pellets to be processed, one may not remove the shaft since pellets will fall smothery over the feeding screw 110. In the instant case the motor 106 of the crusher will be shut off. The proposed idea can be applied to any size of extruders (lab scale extruder to large scale industrial extruders). Various industries may also benefit from current invention such as polymers and plastics, food, etc.

In the instant invention, a universal main feeder 104 having a cutting device 102 is run by a motor 106 and a container to receive the item for disposal or recycling. A shaft connects the cutting device and the motor. The shaft or the motor has a sensor and that determines the speed and size of the item to be made of a specific shape and specific size to be fed into the feeding device 110 which is connected to the universal main feeder and an extruder inlet 122 to allow the reduced size item received from the universal main feeder to the extruder inlet. It is very common for the feeding device to be clogged due to excessive material or wrong size of material being introduced at a wrong speed or quantity. The sensor and the motors 108 and 106 coordinate the effort to allow optimal reduced size item into the feeder, which in turn feeds the extruder 116 via the hopper 122. The extruder then sends the extruded material using a shaft 114 to the die 120 to mold the piece in chamber 118. A second motor (may be 112) connected to the feeding device having at least one of a same speed, opposite speed and greater speed for rotation than the motor connecting the cutting device and the shaft. This speed control enables the items to be controlled before they are fed into the next system.

In some cases wherein the specific shape is smaller than an initial shape. The initial specific shape may be a whole bottle for example. Once it goes through the universal main feeder the bottle may become a flake. That would be the smaller than an initial size. The specific shape of the cutting device is at least one a blade, hammer mill blade and knives. The extruder inlet may be a secondary hopper. In one embodiment, the extruder shaft is at least one of a barrel and screw. The new reusable product may be a synthetic material consumable.

In one embodiment as a method, one may receive a large item into a universal main feeder for reducing a size of a large item to a small item. Once the item is in rate of rotation of the cutting device for reducing the initial size of the item to a smaller size may be controlled using as sensor. One way to control the clogging, and running a smooth operation would be to control the inflow of the small item into the a feeding screw drive by the sensor; adjusting the size of the small item by sensing a rotation of the feeding screw drive; and providing a specific size of the small item to the extruder to create new material for the die to make a new reusable material.

In addition, it will be appreciated that the various combination of the universal main feeder with interchangeable blades are disclosed herein may be embodied using means for achieving an efficient recycling system for smooth operations. Accordingly, the specification and drawings are to be regarded in an illustrative rather than a restrictive sense.

What is claimed is:

1. A recycling system, comprising:
   a universal main feeder having a cutting device run by a motor and a container to receive an item for disposal, wherein the cutting device is changeable; wherein the item has an initial size that is large; wherein the universal feeder cuts the item that is large to a smaller size item to be fed into a feeding device;
   a shaft residing in the universal main feeder connecting the cutting device and the motor;
   the feeding device connected to the universal main feeder and an extruder inlet to allow the smaller size item received from the universal main feeder to the extruder inlet;
   a sensor to control the speed of the motor and the speed of a second motor to manage an in-flow into the universal main feeder and an out-flow to the extruder inlet along with determining a specific shape and a specific size of the item to be fed into the feeding device; and
   an extruder to process and send the item that has been reduced in a specific shape and a specific size using the universal main feeder and the feeding device to a die to make a new reusable product.

2. The recycling system of claim 1, further comprising:
   the second motor connected to the feeding device having at least one of a same speed, opposite speed and greater speed for rotation than the motor connecting the cutting device and the shaft.

3. The recycling system of claim 1, wherein the specific shape is smaller than an initial shape.

4. The recycling system of claim 1, wherein the specific size is smaller than an initial size.

5. The recycling system of claim 1, wherein the cutting device is at least one a blade, hammer mill blade and knives.

6. The recycling system of claim 1, wherein the extruder inlet is a secondary hopper.

7. The recycling system of claim 1, wherein the extruder is at least one of a barrel and screw.

8. The recycling system of claim 1, wherein the new reusable product may be a synthetic material consumable.

9. The recycling system of claim 1, wherein the sensor controls the clogging and running of smooth operation of the recycling system by determining the specific shape and specific size of the item to be fed into the feeding device.

* * * * *